United States Patent [19]
Werbos

[11] Patent Number: 5,924,085
[45] Date of Patent: Jul. 13, 1999

[54] STOCHASTIC ENCODER/DECODER/ PREDICTOR

[76] Inventor: Paul J. Werbos, 8411 48th St., College Park, Md. 20740

[21] Appl. No.: 08/862,691

[22] Filed: May 23, 1997

Related U.S. Application Data

[63] Continuation of application No. 08/115,198, Aug. 31, 1993, Pat. No. 5,751,915, which is a continuation-in-part of application No. 08/091,170, Jul. 13, 1993.

[51] Int. Cl.⁶ .................................................... G06F 15/18
[52] U.S. Cl. ...................................... 706/2; 706/3; 706/8
[58] Field of Search ............................................. 706/1–9

[56] References Cited

U.S. PATENT DOCUMENTS 5,448,681  9/1995  Khan .

*Primary Examiner*—Tariq R. Hafiz
*Attorney, Agent, or Firm*—Oblon, Spivak, McClelland, Maier & Neustadt, P.C.

[57] ABSTRACT

An artificial intelligence system is provided which makes use of a dual subroutine to adapt weights. Elastic Fuzzy Logic ("ELF") System is provided in which classical neural network learning techniques are combined with fuzzy logic techniques in order to accomplish artificial intelligence tasks such as pattern recognition, expert cloning and trajectory control. The system may be implemented in a computer provided with multiplier means and storage means for storing a vector of weights to be used as multiplier factors in an apparatus for fuzzy control.

6 Claims, 4 Drawing Sheets

5,924,085

STOCHASTIC ENCODER/DECODER/PREDICTOR

This is a Continuation of application Ser. No. 08/115,198, Aug. 31, 1993, now U.S. Pat. No. 5,751,915, which is a Continuation-in-part of application Ser. No. 08/091,170, filed Jul. 13, 1993.

FIELD AND BACKGROUND OF THE INVENTION

The present invention relates in general to artificial intelligence systems and in particular to a new and useful device which combines artificial neural network ("ANN") learning techniques with fuzzy logic techniques.

Both neural network learning techniques and fuzzy logic techniques are known. In fact, prior combinations of the two techniques are known as well, as for example U.S. Pat. No. 5,179,624 issued Jan. 12, 1993 to Amano ("Speech recognition apparatus using neural network and fuzzy logic"), which is incorporated herein by reference.

Both techniques attempt to replicate or improve upon a human expert's ability to provide a response to a set of inputs. ANNs extract knowledge from empirical databases used as training sets and fuzzy logic usually extracts rules from human experts.

In very brief summary, neural network techniques are based on observation of what an expert does in response to a set of inputs, while fuzzy logic techniques are based on eliciting what an expert says he will do in response to a set of inputs. Many authors, including Applicant, have recognized the potential value of combining the capabilities of the two techniques.

Applicant is the author of Chapters 3, 10 and 13 of D. White & D. Sofge, *Handbook of Intelligent Control: Neural, Fuzzy and Adaptive Approaches*, Van Nostrand, 1992, ("HIC"), which was published no earlier than Sep. 1, 1992 and which contains disclosure of a number of novel inventions which will be summarized and claimed herein. The entirety of those chapters are incorporated herein by reference.

The invention described and claimed herein comprises an Elastic Fuzzy Logic ("ELF") System in which classical neural network learning techniques are combined with fuzzy logic techniques in order to accomplish artificial intelligence tasks such as pattern recognition, expert cloning and trajectory control. The ELF system may be implemented in a computer provided with multiplier means and storage means for storing a vector of weights to be used as multiplier factors in an apparatus for fuzzy control. The invention further comprises novel techniques and apparatus for adapting ELF Systems and other nonlinear differentiable systems and a novel gradient-based technique and apparatus for matching both predicted outputs and derivatives to actual outputs and derivatives of a system.

NEURAL NETWORKS

Artificial Neural Networks ("ANNs") are well known, and are described in general in U.S. Pat. No. 4,912,654 issued Mar. 27, 1990 to Wood ("Neural networks learning method") and in U.S. Pat. No. 5,222,194 issued Jun. 22, 1993 to Nishimura ("Neural network with modification of neuron weights and reaction coefficient"), both of which are incorporated herein by reference.

ANNs typically are used to learn static mappings from an "input vector," X, to a "target vector," Y. The first task is to provide a training set—a database—that consists of sensor inputs (X) and desired actions (y or u). The training set may, for example, be built by asking a human expert to perform the desired task and recording what the human sees (X) and what the human does (y). Once this training set is available, there are many neural network designs and learning rules (like basic backpropagation) that can learn the mapping from X to y. Given a training set made up of pairs of X and y, the network can "learn" the mapping by adjusting its weights so as to perform well on the training set. This kind of learning is called "supervised learning" or "supervised control". Advanced practitioners of supervised control no longer think of supervised control as a simple matter of mapping X(t), at time t, onto y(t). Instead, they use past information as well to predict y(t).

Broadly speaking, neural networks have been used in control applications:

1. As subsystems used for pattern recognition, diagnostics, sensor fusion, dynamic system identification, and the like;
2. As "clones" which learn to imitate human or artificial experts by copying what the expert does;
3. As "tracking" systems, which learn strategies of action which try to make an external environment adhere to a pre-selected reference model.
4. As systems for maximizing or minimizing a performance measure over time. For true dynamic optimization problems, there are two methods of real use: (1) the backpropagation of utility (which may be combined with random search methods); (2) adaptive critics or approximate dynamic programming. The backpropagation of utility is easier and more exact, but it is less powerful and less able to handle noise. Basic backpropagation is simply a unique implementation of least squares estimation. In basic backpropagation, one uses a special, efficient technique to calculate the derivatives of square error with respect to all the weights or parameters in an ANN; then, one adjusts the weights in proportion to these derivatives, iteratively, until the derivatives go to zero. The components of X and Y may be 1's and 0's, or they may be continuous variables in some finite range. There are three versions of backpropagating utility: (1) backpropagating utility by backpropagation through time, which is highly efficient even for large problems but is not a true real-time learning method; (2) the forward perturbation method, which runs in real time but requires too much computing power as the size of the system grows; (3) the truncation method, which fails to account for essential dynamics, and is useful only in those simple tracking applications where the resulting loss in performance is acceptable. D. White & D. Sofge, *Handbook of Intelligent Control: Neural, Fuzzy and Adaptive Approaches*, Van Nostrand, 1992, ("HIC") describes these methods in detail and gives pseudocode for "main programs" which can be used to adapt any network or system for which the dual subroutine is known. The pseudocode for the ELF and F_ELF subroutines provided below may be incorporated into those main programs (though the F_X derivatives need to be added in some cases).

Backpropagation cannot be used to adapt the weights in the more conventional, Boolean logic network. However, since fuzzy logic rules are differentiable, fuzzy logic and backpropagation are more compatible. Strictly speaking, it is not necessary that a function be everywhere differentiable to use backpropagation; it is enough that it be continuous and be differentiable almost everywhere. Still, one might expect better results from using backpropagation with modified fuzzy logics, which avoid rigid sharp corners like those of the minimization operator.

One widely used neural network (a multi-layer perceptron) includes a plurality of processing elements called neural units arranged in layers. Interconnections are made between units of successive layers. A network has an input layer, an output layer, and one or more "hidden" layers in between. The hidden layer is necessary to allow solutions of nonlinear problems. Each unit is capable of generating an output signal which is determined by the weighted sum of input signals it receives and a threshold specific to that unit. A unit is provided with inputs (either from outside the network or from other units) and uses these to compute a linear or non-linear output. The unit's output goes either to other units in subsequent layers or to outside the network. The input signals to each unit are weighted either positively or negatively, by factors derived in a learning process.

When the weight and threshold factors have been set to correct levels, a complex stimulus pattern at the input layer successively propagates between hidden layers, to result in an output pattern. The network is "taught" by feeding it a succession of input patterns and corresponding expected output patterns; the network "learns" by measuring the difference (at each output unit) between the expected output pattern and the pattern that it just produced. Having done this, the internal weights and thresholds are modified by a learning algorithm to provide an output pattern which more closely approximates the expected output patter, while minimizing the error over the spectrum of input patterns. Neural network learning is an iterative process, involving multiple "lessons".

In contrast, some other approaches to artificial intelligence, i.e., expert systems, use a tree of decision rules to produce the desired outputs. These decision rules, and the tree that the set of rules constitute, must be devised for the particular application. Expert systems are programmed, and generally cannot be trained easily. Because it is easier to construct examples than to devise rules, a neural network is simpler and faster to apply to new tasks than an expert system.

FUZZY CONTROL

Fuzzy logic or fuzzy control is also known and is described in general in U.S. Pat. No. 5,189,728 issued Feb. 23, 1993 to Yamakawa ("Rule generating and verifying apparatus for fuzzy control"), which is incorporated herein by reference.

In conventional fuzzy control, an expert provides a set of rules—expressed in words—and some information about what the words in the rules mean. Fuzzy control then is used to translate information from the words of an expert into a simple network with two hidden layers, as described in detail in Yasuhiko Dote, "Fuzzy and Neural Network Controllers", in Proceedings of the Second Workshop on Neural Networks, Society for Computer Simulation, 1991. Briefly, the expert knows about an input vector or sensor vector, X. He knows about a control vector u. He uses words ("semantic variables") from the set of words $A_i$ through $A_m$ when describing X. He uses words from the set $Y_I$ through $Y_n$ when describing u. He then provides a list of rules which dictate what actions to take, depending on X. A generic rule number i would take the form:

$$\text{If } A_{i1} \text{ and } A_{i2} \text{ and } \ldots A_{in} \text{ then } Y_{mi} \tag{1}$$

To make these rules meaningful, he specifies membership functions $\mu(x)$ and $\mu(u)$ which represent the degree to which the vectors X and u have the properties indicated by the words $A_i$ and $Y_j$. Typically, a given word $A_i$ appears in several different rules. This information from the expert is translated into a two-hidden-layer network as follows.

The set of input words across the entire system are put into an ordered list. The first word may be called $A_1$, the second $A_2$, and so on, up to the last word, $A_n$. The rules also form a list, from rule number 1 to rule number R. For each rule, the rule number j, one must look up each input word on the overall list of words $A_1$; thus if "B" is the second word in rule number j, then word B should appear as $A_k$ on the overall list, for some value of k. one may define "$i_{j,2}$" as that value of k. More generally, one may define $i_{j,n}$ as that value of k such that $A_k$ matches the nth input word in the rule number j. Using this notation, rule number j may be expressed as:

$$\text{If } A_{ij,1} \text{ and } A_{ij,2} \text{ and } \ldots \text{ and } A_{ij,nj} \text{ then do } u'(j) \tag{2}$$

where nj is the number of input words in the rule number j, and where u'(j) refers to u'(D) for the verb D of rule number j.

The first hidden layer is the membership layer:

$$x_i = \mu(x) i = 1, \ldots, m \tag{3}$$

The next hidden layer is the layer of rule-activation, which calculates the degree to which rule number j applies to situation X:

$$R_i = x_{i_1} * x_{i_2} * \ldots * x_{i_m} \tag{4}$$

The output layer is the simple "defuzzification" rule used in most practical applications, and described in Yasuhiko Dote, supra:

$$u = \frac{\sum R_i u'}{\sum R_i}, \tag{5}$$

where $$\sum R = 1 / \sum_i R_i \tag{6}$$

None of these equations contains any adjustable weights or parameters; therefore, there is no way to use the methods of neurocontrol on such a system directly.

Equations 3 through 6 can be expressed in pseudocode:

```
SUBROUTINE FUZZ(x,X);
    REAL u(n), X(m), x(na), R(r), RSIGMA, uprime(n,r),
        running_product, running_sum;
    REAL FUNCTION MU(i,X);
    INTEGER j,k,l,nj(r),i(r,na)
/* First implement equation 3. Use k instead of i for computer.*/
    FOR k=1 TO na;
        x(k) = MU(k,X);
/* Next implement equation 4.*/
    FOR j=1 TO r;
        running_product=1;
        FOR k=1 TO nj(r);
            running_product=running_product*x(I(j,k));
        end;
        R(j)=running_product;
/* Next implement equation 6 */
    running_sum=0;
```

-continued

```
    FOR j=1 TO R:
        RUNNING_sum=running_sum + R(j);
    RSIGMA=1/running_sum;
/* Next implement equation ₅*/
    FOR k=1 to n;
        running_sum=0;
        FOR j=1 to r;
            running_sum=running_sum+R(j)*uprime(k,j);
            end;
        u(k)=running_sum*RSIGMA;
        end;
    end;
```

The subroutine above inputs the sensor array X and outputs the control array u. The arrays uprime and i and the function MU represent u'(j), $i_{j,k}$ and the set of membership functions, respectively; they need to be generated in additional, supplementary computer code.

In addition to adapting weights, the neural network literature also includes methods, described in detail in HIC, for adding and deleting connections in a network. Applied to fuzzy systems, these methods would translate into methods for changing rules by adding or deleting words, or even adding new rules. However, those methods generally assume the presence of adaptable weights.

Nevertheless, equations 3 through 6 can be differentiated, in most cases; therefore, it is still possible to backpropagate through the network, using the methods given in HIC. This makes it possible to use conventional fuzzy systems as part of a neurocontrol scheme; however, neurocontrol cannot be used to adapt the fuzzy part itself.

While useful, this technique has limitations. It does not work well for tasks which require that an expert develop a sense of dynamics over time, based an understanding of phenomena which are not directly observed. A design which is based on static mapping from X(t) to u(t) cannot adequately capture the behavior of the human expert in that kind of application.

Furthermore, the most common version of adaptable fuzzy logic is based on putting parameters into the membership functions rather than the rules. This has two disadvantages.

First, changing the membership function, changes the definition of the word A. Thus the system is no longer defining words in the same way as the expert. This could reduce the ability to explain to the expert what the adapted version of the controller is doing, or even what was changed in adaptation.

Second, changing the membership functions does not allow changing the rules themselves; thus the scope for adaptation is very limited.

PRIOR ATTEMPTS TO COMBINE NEURAL NETWORKS WITH FUZZY LOGIC

There are many ways to combine neural network techniques and fuzzy logic for control applications, described in detail in Paul Werbos, "Neurocontrol and Fuzzy Logic; Connections and Designs," *International Journal on Approximate Reasoning*, Vol. 6, No. 2, February 1992, p.185. For example, one can use fuzzy logic to provide an interface between the statements of human experts and a controller; neural network techniques can adapt that same controller to better reflect what the experts actually do or to improve performance beyond that of the human.

In the current literature, many people are using fuzzy logic as a kind of organizing framework, to help them subdivide a mapping from X to Y into simpler partial mappings. Each one of the simple mappings is associated with a fuzzy "rule" or "membership function." ANNs or neural network learning rules are used to actually learn all of these mappings. There are a large number of papers on this approach, reviewed by Takagi, Takagi, H., Fusion technology of fuzzy theory and neural networks, Proc. Fuzzy Logic and Neural Networks, Izzuka, Japan, 1990. However, since the ANNs only minimize error in learning the individual rules, there is no guarantee that they will minimize error in making the overall inference from X to Y. This approach also requires the availability of data in the training set for all of the intermediate variables (little R) used in the partial mappings.

A paper submitted to The Journal of Intelligent and Fuzzy Systems by Applicant (Elastic Fuzzy Logic: A Better Fit With Neurocontrol), and awaiting publication shows how a modified form of fuzzy logic—elastic fuzzy logic—should make this hybrid approach much more powerful, allowing the full use of the many methods now available in neurocontrol. A copy of the paper is incorporated herein by reference and is attached as FIG. 4.

The basic idea is to use fuzzy logic as a kind of translation technology, to go back and forth between the words of a human expert and the equations of a controller, classifier, or other useful system. One can then use neural network methods to adapt that system, so as to improve performance.

Other researchers have proposed something like ELF, but without the $\gamma_{ij}$ exponents. These exponents play a crucial role in adapting the content of each rule; therefore, they are crucial in providing more complete adaptability.

An advantage of ELF is the ability to explain the adapted controller back to the expert. The $\gamma_{j,0}$ parameters can be reported back as the "strength" or "degree of validity" of each rule. The parameters $\gamma_{j,k}$ can be described as the "importance" of each condition (input word) to the applicability of the rule. In fact, if the parameters $\gamma_{j,k}$ are thought of as the "elasticities" used by economists; the whole apparatus used by economists to explain the idea of "elasticity" can be used here as well.

Another advantage of ELF is the possibility of adaptive adding and pruning of rules, and of words without words. When γ parameters are near zero, then the corresponding word or rule can be removed. This is really just a special case of the general procedure of pruning connections and neurons in neural networks—a well-established technique. Likewise, new connections or rules could be tested out safely, by inserting them with Y's initialized to zero, and made effective only as adaptation makes them different from zero. In summary, neural network techniques can be used with ELF nets to adapt the very structure of the controller.

Other authors have suggested putting weights into the membership functions, but this does not provide as much flexibility as one needs for true adaptation, in most applications. In most applications, one needs to find a way to modify the rules themselves. (Modifying the membership functions is sometimes desirable, but it is not the same as modifying the rules, because—for example—a given word usually appears in several rules; each rule needs to be modifiable independently.)

An object of the present invention is to provide a new and useful apparatus which can provide more powerful methods for artificial intelligence applications.

A further object of the invention is to provide a tool for artificial intelligence applications which allows weighting the importance of various factors without weighting the membership functions.

A further object of the invention is to provide a means which is a framework for communication between an expert and a computer model which retains a format and vocabulary readily understandable by a human expert.

A further object of the invention is to provide a means for providing the flexibility to introduce factors at the outset of analysis, without knowing whether they will turn out to be relevant or not, in a manner which permits deleting them without undue complication should they turn out to be non-relevant.

A further object of the invention is to provide an intuitive means for-communicating to a human expert the importance which a computer model attaches to a particular rule.

These and other objects may be accomplished by means of a central processing unit incorporating dual subroutines. These and other objects may also be accomplished by introducing a weighting means of a multiplicative form, which may be conceptualized mathematically by replacing equation 2 above by:

$$R_i = \gamma_{i_o} * x_{i_1}^{\gamma i,1} * x_{i_2}^{\gamma i,2} * \ldots * x_{i_m}^{\gamma i,m} \qquad (7)$$

and defining the weights in the network as the combined sets of parameters $\gamma$ and vectors $u'$. This has the advantage of allowing the translation the words of an expert into a network as before, simply by initializing all the $\gamma$ parameters to one. A feature of the system is the resultant natural way to report the results. The modified $u'$ vectors can be reported out directly and reported in terms of their fit to the words $\gamma_i$. The $\gamma$ coefficients can be described as "elasticities," as measures of the degree of importance of the semantic variable to the applicability of the rule. Elasticity coefficients have been widely used in economics, and can be understood very easily intuitively, by people with limited knowledge of mathematics. Thus, while elastic fuzzy logic makes it easy, as before, to translate back and forth between a human expert and a network, unlike the conventional logic, it also makes it possible to carry out truly major adaptations of the network using neural network methods. This kind of adaptation makes it easy as well to modify rules as part of the adaptation; for example, words with an elasticity near zero can be deleted from a rule, and new words can be added to a rule in a safe way by initializing their elasticity to zero.

The various features of novelty which characterize the invention are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing in the present embodiments, from study of the following drawings, in which.

DESCRIPTION OF THE PREFERRED EMBODIMENT

Elastic Fuzzy Logic (to be abbreviated ELF) provides a very broad range of new capabilities for fields such as control engineering, automatic pattern recognition, financial trading systems, and so on. Generically, the types of application now envisioned involve "control" (automatic systems which output desired actions, such as motor controls, stock trades, or settings for simpler controllers like thermostats), "mapping" (such as systems to input a picture and output a desired classification, or systems to input chemical sensor data and output a prediction of actual chemical concentrations), "system identification" (such as systems to input past transactions data and predict future stock prices or systems to simulate future prices according to an implicit probability distribution), data compression, and applications where knowledge-based systems or expert systems are now used.

ELF may be used in all these classical applications of fuzzy logic, because it too provides a way of translating from rules expressed in words into mathematical equations; however it translates rules into a different class of mathematical equations, which permit a later adaptation of the equations to improve performance in real applications. This application can be done using extensions of adaptation techniques developed initially for artificial neural networks (ANNs). In a 1990 NASA conference paper, reprinted in IJAR 1992, Applicant proposed a three—step process—translating rules into equations, adapting the equations, and then translating the results back into something the human expert can understand; however, the mathematical equations used in conventional fuzzy logic do not provide great scope for adaptation. Many, many researchers have tried to follow up on the 1990 suggestion, but the schemes they came up with all included very little scope for adaptation, or use of ANN components which turned the system into a "black box" (with the inherent lack of communication back to the expert) or both. The class of functions used in ELF overcomes these imitations.

More precisely, ELF, refers to a particular technique for translating back and forth between rules expressed in words (and in simple numbers understandable to the expert) and the corresponding mathematical equations to be implemented in computer hardware and software. It also subsumes the class of mathematical equations to be implemented in hardware and software, for such applications, and the techniques used to adapt these equations automatically.

Figure 3:
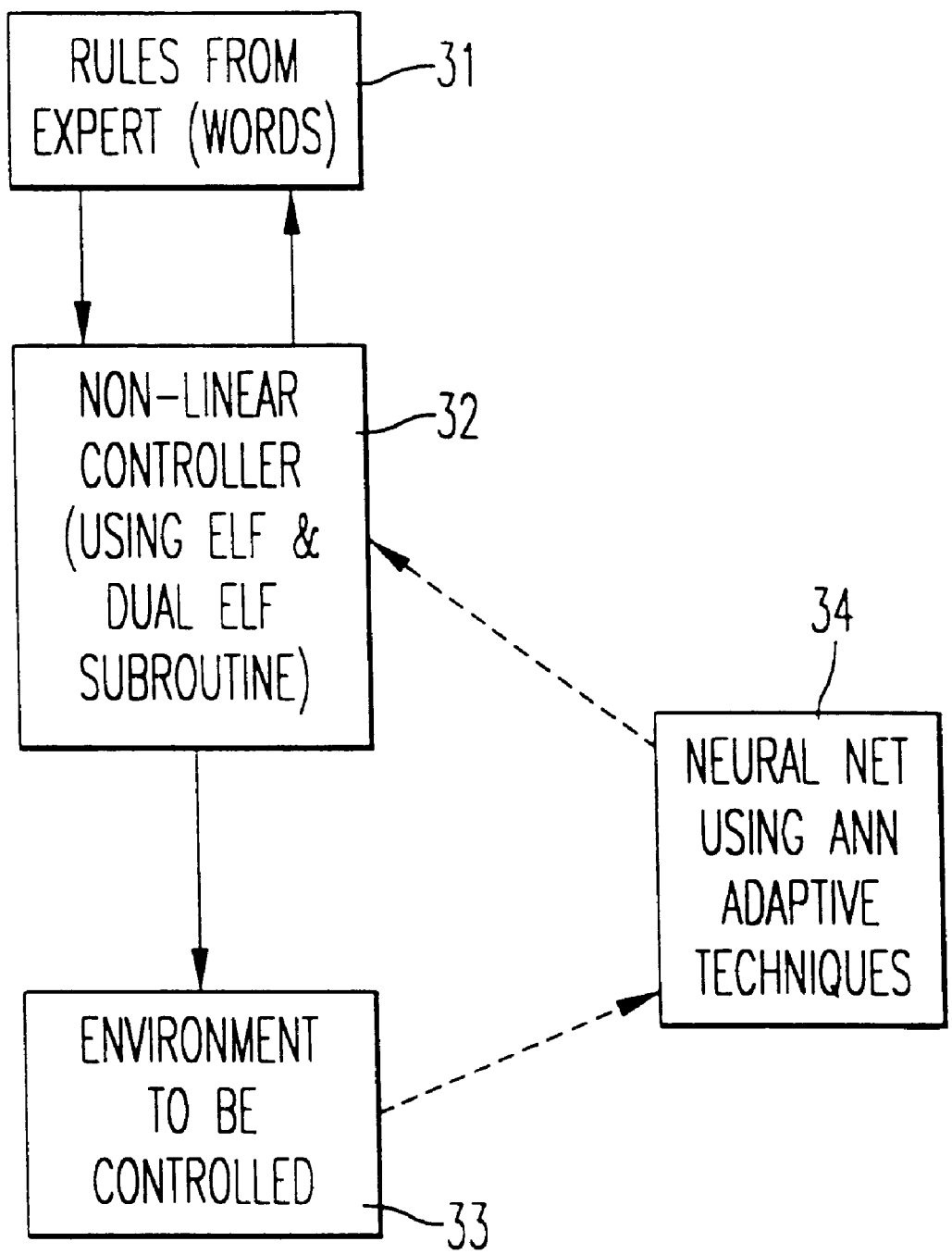
FIG. 3 is an overview of Operating Characteristics.
Figure 4:
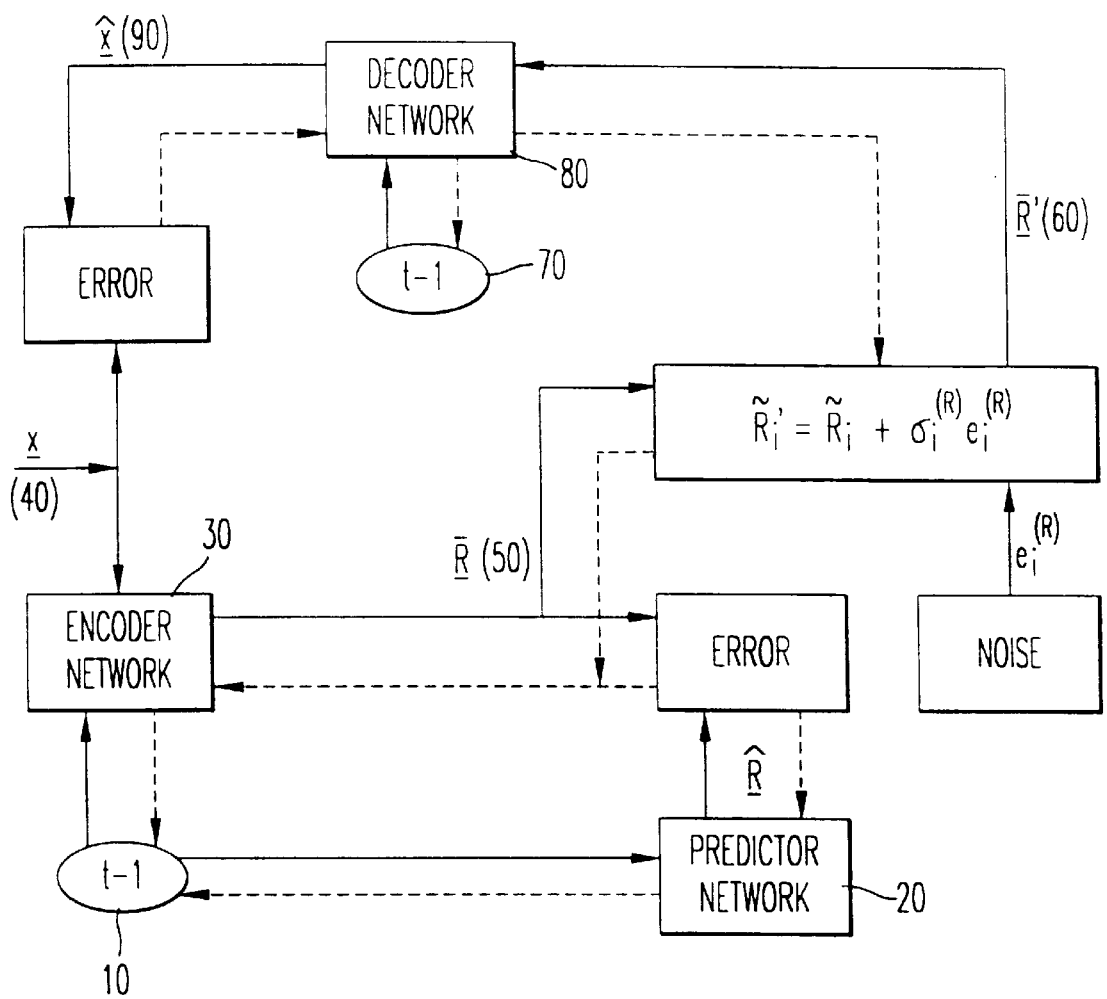
FIG. 4 is a flow chart illustrating a Stochastic/Encoder/Decoder/Predictor.

In addition to the fuzzy logic applications, the techniques used in ELF may be used as a new kind of artificial neural network (ANN) as shown in FIG. 3, which illustrates the process by which a non-linear controller using ELF and Dual ELF subroutine (32) interacts with an expert through words (31) and with an environment to be controlled (33) through the intermediary of a neural net using ANN adaptive techniques (34). In other words, one may use the capabilities to be illustrated below, but without the human expert.

Figure 1:
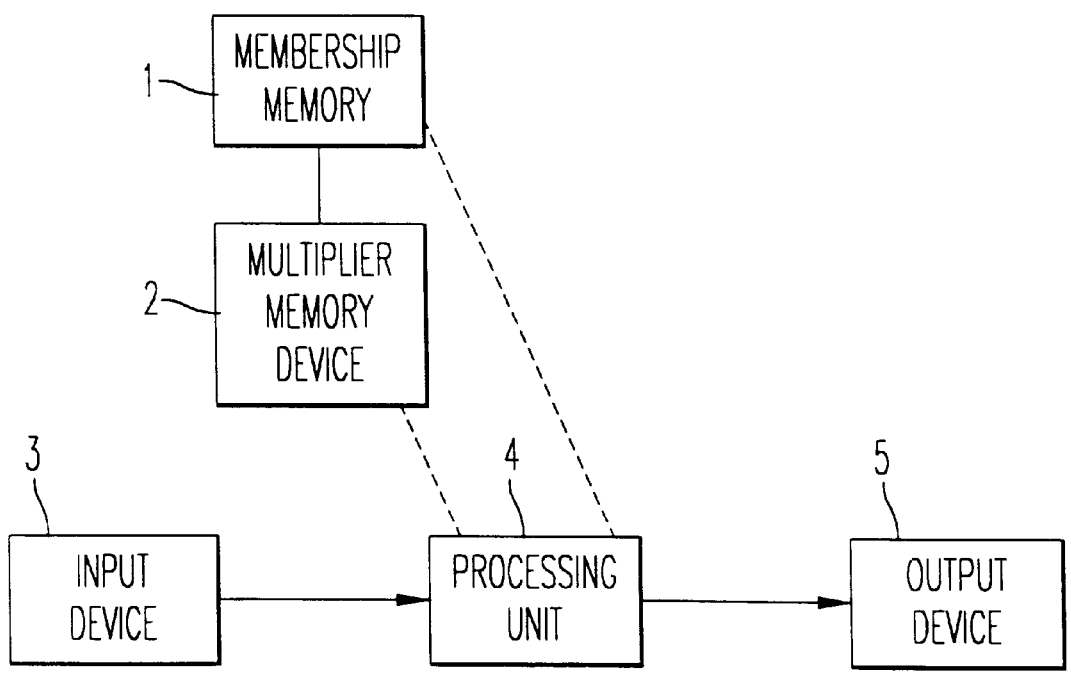
FIG. 1 is an overview schematic of an Apparatus for Fuzzy Control using ELF.

Referring to the drawings, the invention is an Elastic Fuzzy Logic ("ELF") System in which classical neural network learning techniques are combined with fuzzy logic techniques in order to accomplish artificial intelligence tasks such as pattern recognition, expert cloning and trajectory control, shown in overview in FIG. 1.

In elastic fuzzy logic, the words coming from the expert can be translated initially into equations which are absolutely equivalent to those above. However, additional parameters are inserted into the system for use in later adaptation. Equation 4 is replaced by the equation:

$$R_j = \gamma_{oj} * X_{i_{1j}}^{\gamma 1 j} * X_{i_{2j}}^{\gamma 2 j} * \ldots * x_{i_{mj}}^{\gamma m j} \qquad (8)$$

where the gamma parameters are all set to one initially.

A new subroutine ELF(u,X,gamma,uprime) is similar to the subroutine FUZZ above, except that space is allocated for the array gamma by:

REAL gamma(r, 0:na)

and the block which implemented equation 4 is replaced by:

```
/* Implement equation 8 */
    FOR j = 1 TO r;
        running_product= gamma (j,0);
        FOR k = 1 to nj(r);
            running_product= running_product*(x(i(j,k))**gamma
            (j,k)); end;
        R(j) = running_product
    end;
```

Referring to FIG. 1, in general, the invention may be implemented in an apparatus for fuzzy control, comprising:

1) a membership memory for (1) storing a plurality of membership functions for fuzzy control concerning one or more input variables and output variables;
2) a multiplier memory device (2) for storing a plurality of multiplier factors associated with each said membership function;
3) an input device (3) for entering data comprising one or more input values and associated output values;
4) a processing unit (4) for receiving said input values from said input device and for retrieving at least one of said plurality of functions from said membership memory and for retrieving at least one of said plurality of multiplier factors from said multiplier memory; and
5) an output device (5) for producing an output comprising said membership functions, said input data and said multiplier factors. The output device may feed data to a human expert or to another computer program, such as another fuzzy logic device or an artificial neural network. The processing unit may also perform a fuzzy inference by applying said membership functions and said multiplier factors to said input and outputting an output value as an end result.
6) The processing unit preferably will perform a calculation of the form $$R_i = \gamma_{i_o} * x_{i_1}^{\gamma i,1} * x_{i_2}^{\gamma i,2} * \ldots * x_{i_m}^{\gamma i,m}$$

Figure 2:
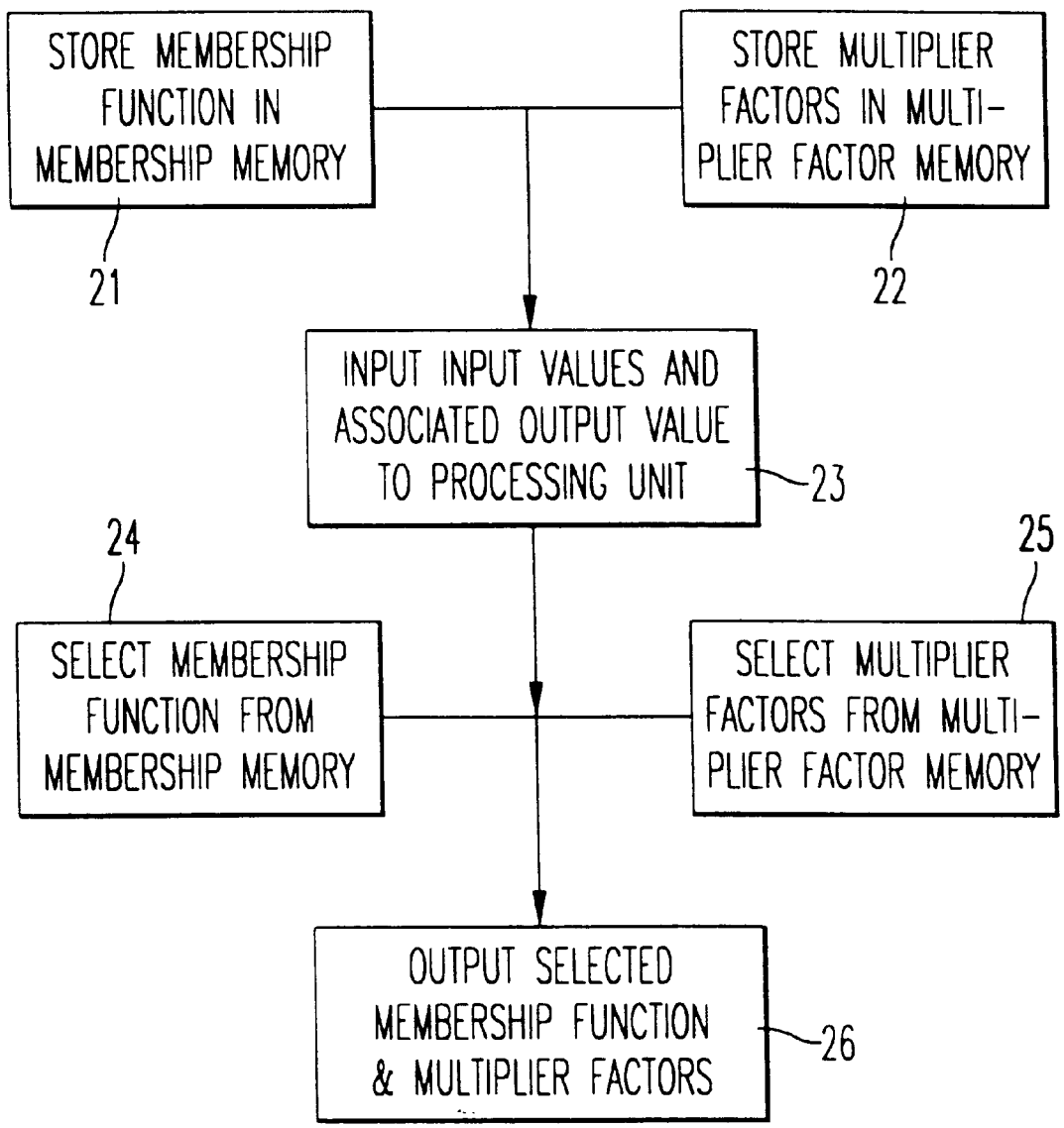
FIG. 2 is a flow chart for operating a Fuzzy Controller according to the ELF process.

Referring to FIG. 2, in general, a fuzzy controller having a membership memory, a multiplier factor memory and a processing unit, may be operated according to the following steps:

1) store in said membership memory a plurality of predetermined membership functions for fuzzy control concerning an input variable and a plurality of predetermined membership functions for fuzzy control concerning an output variable (21);
2) store in said multiplier factor memory a plurality of multiplier factors (22);
3) input to said processing unit with an input device data comprising input values and an output value to be later obtained by a fuzzy inference when an input value is given (23);
4) select a membership function from membership function memory (24);
5) select the multiplier factors associated with said membership function (which may initially be set to zero or to some other value) (25);
6) output the selected membership functions and multiplier factors concerning the input and output variables to an output device. The device may be another fuzzy controller, a neural network or a human readable printout or screen display for example (26).
7) Preferably, the processing unit will perform a calculation of the form $$R_i = \gamma_{i_o} * x_{i_1}^{\gamma i,1} * x_{i_2}^{\gamma i,2} * \ldots * x_{i_m}^{\gamma i,m}$$

The above disclosure describes how to adapt ELF networks so as to make the actual outputs, Y hat, match desired outputs, Y, over a training set. Similar techniques, called supervised learning, are in the public domain for many classes of artificial neural network.

Not in the literature—for ELF or any other differentiable system—is a gradient-based technique designed to make the actual outputs Y hat match both the desired outputs Y and the derivatives of the outputs Y. A technique which can match both is useful in applications where there are target derivatives as well as target quantities Y, for example in an aerospace application, where one may wish to adapt a simple network to approximate a very complex fluid-dynamics program. Using the techniques given in HIC, one may write and debug a dual subroutine for the fluid dynamics program, which then makes its derivatives available at a low cost (derivatives of a few key outputs) across all the inputs to the code, at a relatively low computational cost. One may then adapt an ELF network or any other twice-differentiable system to approximate BOTH the raw, basic function and the derivatives of interest.

Mathematically, the approach is as follows. Suppose that we have an existing computer code C which we are trying to emulate, and a relatively small vector of key results V (which might represent factors like total turbulence or heating or engine speed output from the code). We may represent this as:

$$Y = C(X)$$

$$V = V(Y),$$

where X represents inputs to the code, Y represents outputs, V the figures of merit, and where there is some weight $A_i$ for the importance of $V_i$ and some weight $B_k$ for the importance of each input $X_k$. (An obvious choice is the variance of $X_k$, or a value-based weight of some kind). We may define the error function:

$$e = \sum_i (Y_i - \hat{Y}_i)^2 + \sum_{j,k} A_j B_k * \left( \frac{\partial V_j}{\partial X_k} - \frac{\partial \hat{V}_j}{\partial X_k} \right)$$

(or we may use some other power besides the second power). As an initial stage, we may calculate the derivatives of V with respect to X by using the dual function for the computer code C; those are then treated as constants in the adaptation stage. V hat represents the results from applying the known function V to the outputs of the ELF network (or other nonlinear system). Using the techniques of chapter 10 of HIC, we may simply write out the (dual) equations required to compute this error function. Using those techniques on the resulting forwards system, we then derive the equations of a doubly-dual system to give us the required gradient of error with respect to the weights in the ELF network (or alternate). We may then use these derivatives in adapting those weights.

The following examples will further illustrate the invention.

EXAMPLE I

ADAPTING ELF BY SUPERVISED CONTROL

In supervised control, the user first creates a database of "correct" control actions. For each example, example number t, the user provides a vector of sensor inputs X(t) and a vector of desired or correct control actions, u'(t). The weights in the system are usually adapted so as to minimize:

$$E_{tot} = \Sigma E(t) = \Sigma_i (u(t) - u'(t))^2 \qquad (9)$$

In ELF, the weights may be defined as the combination of the gamma parameters and the u' vectors.

To minimize $E_{tot}$ as a function of the weights, the conventional neural-network technique of backpropagation, which is described in detail in P. Werbos, *The Roots of Backpropagation: From Ordered Derivatives to Neural Networks and Political Forecasting*, Wiley, 1993 may be used. This can be described as an iterative approach. On the first iteration, initialize the gamma parameters to one, and initialize uprime to the values given by the expert. On each subsequent iteration, take the following steps:

1. Initialize the arrays of derivatives F_gamma_total(j,k) and F_uprime_total(j,k) to zero
2. For each example t do:
2a. CALL EFL(u'X(t), gamma, uprime)
2b. Calculate the vector of derivatives of E(t) with respect to the components of u(t):

$$F\_u(t) = 2*(u(t) - u'(t))$$

2c. Using backpropagation—the chain rule for ordered derivatives—work the derivatives back to calculate F_gamma(t) and F_uprime(t), the derivatives of E(t) with regard to the gamma and uprime parameters.
2d. Update the array F_gamma_total to F_gamma_total plus F_gamma(t), and likewise for F_uprime_total.
3. Update the arrays of parameters: new gamma=old gamma−LR1 * F_gamma_total new uprime=old uprime−LR2 * F_uprime_total,
where LR1 and LR2 are positive scalar "learning rates" chosen for convenience.

This procedure could be implemented through the following pseudocode:

```
INTEGER iter,t,T,k,j,nj(r)
REAL gamma(r,0:na), uprime(n,r), F_gamma_total(r,0:na), F_uprime total(n,r),
    F_gamma(r,0:na), F_uprime(n,r), X(m,T), ustar(n,T), u(n), F
    u(n), 1r1, 1r2
DO iter= 1 to maximum_iterations;
/* First implement step 1*/
    FOR j=1 TO r;
        FOR k=0 to nj(r);
            FOR k=1 TO n;
                F_uprime_total(k,j)=0;
            end;
        end;
    end;
/*Next implement step 2, starting with 2a*.
    FOR t=1 TO T;
        CALL ELF(u,X(,t),gamma,uprime);
/*Next implement step 2b*/
        FOR k=1 TO n;
            F_u(k)=2*(u(k) − ustar(k,t));
        end;
/* Express step 2c as a subroutine*/
        CALL F_EFL(F_gamma, F_uprime, F_u);
/* Implement step 2d */
        FOR j=1 TO r;
            FOR k=0 TO nj(r);
                F_gamma_total(j,k)=F_gamma_total(j,k)+F
                gamma(j,k);
            end;
            FOR k=1 to n;
                F_uprime_total(k,j)=Fuprime_total(k,j)+F
                uprime(k,j);
            end;
        end;
    end;
/* Finally, step 3*/
    FOR j=1 TO r;
        FOR k=0 to nj(r);
            gamma(j,k)=gamma(j,k)−1r1*F_gamma_total(j,k);
        end;
        FOR k=1 TO n;
            uprime(k,j)=uprime(k,j)−1r2*F_uprime_total(k,j);
        end;
    end;
end;
```

The key challenge remaining is to program the dual subroutine, F EFL, which inputs the derivatives in the array F u and outputs the derivatives in the arrays F_gamma and F uprime.

In order to calculate the derivatives efficiently, starting from knowledge of F_u, one can use the chain rule for ordered derivatives, described in detail in HIC, to derive the following equations:

$$F\_u'(j) = F\_u * R_j * R_S \quad j=1,\ldots,4 \qquad (10)$$

$$F\_R_j = R_S * ((F\_u \cdot u'(j)) - (F\_u \cdot u)) \quad j=1\ldots r \qquad (11)$$

$$F\_Y_{j,1} = F\_R_j * \log x_{ij,k} * R_j = 1\ldots r;\ k=1\ldots nj(j) \qquad (12)$$

$$F\_Y_{j,o} = R\_R_j * R_j / Y_{j,a} \quad j=1\ldots r \qquad (13)$$

where the center dot represents a vector dot product, and where F_u' is a vector. These equations can be implemented through the following subroutine:

```
SUBROUTINE F_ELF(F-gamma, F-uprime, F_u);
REAL u(n), X(m), gamma(r,0:na), uprime(n,r),base,F_gamma(r,0:na),
    F_uprime(n,r),running_sum,F_u(n),R(r),RSIGMA,F_R(r);
INTEGER nj(r),k,j,i(r,na);
/* First calculate F_u dot u, the scalar "base". */
running_sum=0;
FOR k=1 TO n;
    running_sum=running_sum + F_u(k)*(k);
    end;
base=running_sum;
/* Next, implement equations 10 through 13 for each rule j*/
FOR j=1 TO r;
/* Equation 10*/
    FOR k=1 TO n;
        F_uprime (k,j)=F_u(k)*R(j)RSIGMA;
    end;
/*Equation 11*/
running_sum=0;
FOR k=1 TO m;
    running_sum=running_sum+F_u(k) *uprime(k,j);
    end;
F_R(j)=RSIGMA*(running_sum − base);
/*Equation 12*/
    FOR k=1 TO nj(j);
```

-continued

```
    F_gamma(j,k)=F_R(j)*R(j)*log(x(i(j,k)));
    end;
/*Equation 13*/
    F_gamma(j,0)=F_R(j)*R(j)/gamma(j,0);
    end;
```

This dual subroutine could be expanded further, so as to output F_X, the derivatives of E with respect to the inputs X(t); however, that would require knowledge of the membership functions (or another dual subroutine, F_MU).

EXAMPLE II

DEVELOPING A NEW CONTROLLER

One way of using ELF might be in developing a controller for a new class of airplanes, developing as much of the control as possible before the airplane takes off, and building in learning capabilities so as to minimize the cost of redesign during the early test flights of the vehicles. One might develop a controller as follows, using ELF capabilities:

1. In the design stage, build a simplified (i.e. fast) simulator of the airplane. The simulator would specify the available controls (e.g. tension pulling the right front aileron, etc.) and sensor data (e.g. altitude, air speed, etc.).
2. Run the simulator at reduced speed, so that a human expert can learn to control the airplane (i.e. handle low-level steering controls so that the plane stays on some desired course set up as an example). If the human asks for additional sensor input or controls, iterate until a compromise is reached between the expert and the designer.
3. After the human does an adequate job with the slow simulator, or makes a thorough effort to do so, ask the human to provide a list of if-then rules describing how to control the airplane. Try this for several human experts.
4. Using an ELF computer program, input the rules. The ELF program would then output either: (1) a file of rules to be used by an ELF interpreter; (2) a compiled computer program to implement the corresponding mathematical equations, when the rules are translated into equations using the ELF conventions; the program would be set to run on an ordinary workstation; (3) a compiled program to run on a specially equipped workstation, using ELF chips to accelerate the calculations. The ELF program should preferably also implement a "dual subroutine" or an equivalent hardware module for these rules. The implemented version of the rules will be referred to as the "ELF Action Network."
5. Direct inverse control (DIC) can then be used to adapt the ELF Action Network. More precisely, EACH ELF Actin Network coming from EACH expert can be used as the starting point in a DIC adaptation process. Then, the performance of each can be compared. The DIC process simply tries to keep the airplane on the desired course; performance is measured by comparing actual to desired locations along the flight path.
6. If none of the humans or ELF nets did an adequate job, notify the design team. Report the rules developed by the human experts, AND the adapted versions. Report the resulting performance. Also use backpropagation to report out the sensitivity of tracking error to the rule parameters at each time; for example, one might graph the implied derivatives versus the time of impact of the parameter (using techniques parallel to those used in, A Generalization of Backpropagation . . . Recurrent Gas Market Model, Neural Networks, October 1990. This information will help the redesign of the plane. If the humans performed acceptably, but the ELF nets did not, then the ELF nets can be trained using Supervised Control (SC) training methods to imitate the humans. If this fails, then the results should be explained back to the human experts, and new attempts made until the system works.
7. In any case, move on to a higher level adaptation, to improve performance of the controllers developed in stage 5. Define a performance measure which combines both tracking error and fuel consumption and stresses which might tend to age the vehicle. Using techniques described by Applicant in Chapter 10 of HIC develop a "dual subroutine" for the airplane simulator. Then use that simulator, its dual, the performance measure, and its dual to adapt the various ELF nets, using the technique of "backpropagation of utility." The resulting ELF Action nets can be reported back to the human expert and design team, to see if the humans can come up with new ideas and starting points.
8. After the design passes these basic nominal performance standards, a stochastic design phase would begin. First, there would be an assessment of uncertainty and noise by the design team. This would involve identifying uncertain parameters such as possible nonlinear couplings and novel winds effects above Mach 10. It would also involve identifying true noise time-series such as the intensity and temperature of local wind effects buffeting the airplane. A stochastic simulator could be built, in the form of a subroutine which inputs controls and state information at time t, along with possible values for the noise parameters and for noise time-series at time t. A matching random-number generator would actually produce possible values for these random factors.
9. Construct a dual subroutine for the revised simulator.
10. Test the ability of human experts to fly the noisy simulator. Again ask them to provide rules. These rules might refer to the uncertain parameters, either directly or in terms of words describing how the airplane "feels", if so, additional rules for how to guess these parameters will also be needed.
11. Ask the humans to provide "Value Rules". These would be something like: "If (angle is less than desired angle) then one needs more (angle)." In other words, the "if" clause of a value rule is just like the usual "if" clause, but the value clause specifies a state variable which needs to be greater or lesser, to improve control of the vehicle, in the view of the expert.
12. Use the ELF program to translate the value rules from step 11 into a derivative-style "Critic Network." In other words, the program creates a new network which inputs state variables and sensor data, and outputs an estimate of the derivative of future performance with respect to the important state variables.
13. Use the DHP procedure, described in detail in chapters 3 and 13 of HIC to adapt both the Critic networks and ELF networks. Also, for comparison, try other forms of ANN.
14. After all these design tests are complete, if performance is adequate, embed the resulting networks into chips to put into the actual airplane.

15. Steps 1–13 could, of course, be used for several alternative designs, so as to locate the design which is likely to have optimal performance.

Step 4 contains the key innovation.

Techniques already exist to query an expert about the meaning of phrases like "angle is less than desired angle", given a measurement of "angle" and "desired angle". Those techniques can be used to get the required "membership functions". However, if the resulting membership functions are not adequate, an ELF computer expert could provide examples of possible situations to the expert. In this example, the expert might provide examples of possible value pairs of "angle" and "desired angle". (In fact, the ELF computer program might do this, after some initial testing to develop reasonable examples). The expert would be asked to indicate the degree to which the clause applies to each example. The ELF program might then adapt a conventional ANN, such as a multilayer perceptron, to include as a revised membership function in such cases. This does not destroy the "white box" character of the rules, because the conventional ANN is used to develop an understanding of the clause used by the expert.

The key step lies in how the rules are translated into equations. As a basic starting point, an ELF program might translate a rule of the form:

"If A and B and . . . C then do D" (where A . . . D are clauses) into:

$$R = \gamma_o \cdot \mu_a^{\gamma a} \cdot \mu_b^{\gamma b} \ldots \mu_c^{\gamma c} \quad (14)$$

where the γ parameters are all initially set to 1, where μA, etc. refer to the values of the various membership functions for the clauses A, B, . . . , C, where R refers to the degree to which this particular rule is "invoked", and where the asterisk represents multiplication. In conventional fuzzy logic, a similar translation is made, but there are no gamma parameters. The γ exponents are "elasticities," understandable parameters which will be used later to explain the results back to the human expert.

In implementation, the μ functions are normally allowed to vary between 0 and 1 in fuzzy logic. Thus taking exponents should be no problem in hardware implementation. However, one can easily modify this to damp out actual values greater than 1 (if adapted membership functions allow such transient effects). In general, one can use any differentiable f and g in:

$$R = f\left(\gamma_o, \prod_i g(\gamma_i, \mu_i)\right) \quad (15)$$

where a base value (like zero) for $\gamma_o$ has the effect of setting R to zero, and where a base value for $\gamma_i$ has the effect of removing clause number i from the rule.

Finally, to complete the definition of the mathematical equations, one needs to use a "defuzzification" procedure. There are many standard versions of this, ranging from center-of-gravity calculations through to ANNs. By way of simple example, a procedure which uses as inputs only the R for each rule and the desired action vector (based on the clause "D") for each rule might be used; in that way, the desired action vector can be adapted, along with the gamma parameters and parameters (if any) in the membership functions. The standard defuzzification rule might be used:

$$\underline{u} = \left(\sum_i R_i * \underline{u}_i\right) / \sum_i R_i \quad (16)$$

Given these equations, one has a variety of choices for how to implement them in computer software and/or hardware, implementations of which are known to those skilled in the art.

Given the mathematical equations or network in step 4, there are nontrivial issues in how to adapt them (by SC, DIC, BU, DHP, etc.). Since the publication of Applicant's 1990 paper, hundreds of experts with a great interest in neural networks have applied ANNs to control, without being able to replicate the most important capabilities.

Among the important capabilities are those which become available after programming (directly or indirectly, in hardware or software) a "dual subroutine" for ELF. Chapter 10 of HIC, describes how to construct dual subroutines. The specific equations for the dual subroutine for ELF nets appear for the first time in P. Werbos, Neurocontrol and Elastic Fuzzy Logic, *IEEE Trans. Industrial Electronics*, cover date April 1993 (Delayed printing).

Given a dual subroutine, chapters 3 and 13 of HIC, give pseudocode for how to adapt the resulting action net, and any associated critic network. (They also describe how to adapt nets to perform system identification, which would include rules to estimate hidden uncertain parameters or the equivalent). Pseudocode was also given in Miller, Sutton and Werbos, eds, *Neural Networks for Control*, MIT Press, 1990 for the DHP system, but there was a missing term crucial for accurate results; when calculating the target for the critic network, an additional term is needed to account for the derivative in the action network. That missing term appears in Chapter 13 of HIC, a chapter authored by Applicant.

A correction to the published techniques is also necessary in order to improve the performance of Globalized Dual Heuristic Programming (GDHP), a general technique for use in adapting ELF systems, or other nonlinear differentiable systems. In the notation of the Handbook of Intelligent Control (HIC), the correct adaptation procedure is as follows:

1. Obtain R(t), u(t) and R(t+1), for example by the methods discussed in HIC.
2. Calculate:

$$J(t+1) = J(\underline{R}(t+1), W)$$

$$g(t+1) = F\_J_R(\underline{R}(t+1), W)$$

$$F\_u(t) = F\_U_u(\underline{R}(5), \underline{u}(t)) + F\_f_u(\underline{R}(t), \underline{u}(t), g(t+1))$$

$$g^*(t) = F\_f_R(\underline{R}(t)\_, R_u(t)), , g\_(t+1))F \pm uF_t U_R(\underline{R}(t), \underline{u}(t)) +$$

$$`t = `(\underline{R}(t), W)$$

$$g(t) = F\_J_R(\underline{R}(5), W)$$

$$F\_WA = G\_FJJ_{RW}(g^*(t)(-)g(t)U, \underline{R}A,)\underline{R}(t)\_, tW) +$$

3. Adapt the weights W by exploiting the gradient F_W. For example, use the update:

$$W_i \text{ new} = W_i \text{ old} - \text{learning\_rate} * F\_W_i$$

These equations assume a scalar critic, J hat, which may be used to adapt the Action component as with any other scalar criticm, as shown in the inventor's chapters in HIC. The constant $A_o$ and the vector of weights A may be any vector of weights; for example, they may all be chosen as 1, or they may be based on time averages of the vector lambda (giving greater weight to components which have a bigger effect on J), etc. HIC describes how to program the dual functions shown here. To create the dual subroutine G_F_J, simply write out the equations of F_J (using the methods of HIC), ADD an equation for a final result equal to:

$$\text{Result} = \sum_i SA_i * (g^*_i - g_i)^2$$

and then use the procedures of chapter 10 of HIC to create the dual subroutine for the resulting ordered system.

At a low level, there are many procedures which can be used to adapt a controller when the requisite derivatives are available. Among these is the adaptive learning rate rule:

LR new=LR old* (a+b *( new grad DOT old grad)/(old grad DOT old grad), where LR refers to the learning rate used for some block of parameters or weights (such as the gamma parameters or obvious subsets of them), where a and b are arbitrary parameters, where DOT refers to a vector dot product, and where "grad" refers to the currently available gradient, the set of derivatives of error whatever with respect to the set of weights under consideration.

EXAMPLE III

ADGDHP

Given the correct statement of GDHP provided in Example II, and HDP and ADHDP and DHP and ADDHP techniques known to those skilled in the art (as described, for example in HIC) it is straightforward to modify GDHP to create an Action-Dependent version, ADGDHP.

EXAMPLE IV

ADAPTING ELF BY BACKPROPAGATING UTILITY

This example will describe the method for adapting a fuzzy controller which inputs X(t) and outputs u(t), starting from a fixed initial state X(0). It is easy to deal with the more general case, as in Paul Werbos and Andras Pellionisz, "Neurocontrol and Neurobiology: New Developments and Connections", in *Proceedings of the IJCNN* (Baltimore), IEEE, 1992, but one fixed starting value will be used for clarity of illustration. The object is to minimize:

$$\underline{u} = \left(\sum_i R_i * u_i\right) / \sum_i R_i \quad (16)$$

for a known utility function U. Again, for clarity, suppose that X(t+1) depends only on X(t) and u(t), without noise.

To use the backpropagation of utility, it is first necessary to develop an explicit model of the system. For example, using the techniques in P. Werbos, Backpropagation through time: what it does and how to do it, *Proc. of the IEEE*, October 1990 issue or in chapter 10 of HIC, adapt an artificial neural network which inputs X(t) and u(t) and outputs a prediction of X(t+1). Program that network into a computer subroutine, MODEL(Xold,u,Xnew). For the most common neural network models, HIC, describe how to program the dual subroutine for such a model, F_MODEL (F_Xold,F_u,F)Xnew); that subroutine inputs F_Xnew and outputs F_s and F_Xold. Only one dual subroutine is needed for any network, regardless of whether it is being used to calculate the derivatives of error, the derivatives of utility, or anything else.

To adapt the ELF controller, iterate over the following steps:

1. Initialize F_gamma_total, F_uprime_total, and F_X (T+1) to zeroes.
2. For each time, t=1 to time T, calculate X(t) and U(X(t)) by calling three subroutines in order:

CALL ELF(u(t−1),(X(t−1)) (to calculate U(t−1))

CALL MODEL(X(t−1),u(t−1),X(t)) (to calculate X(t))

CALL U(X(t))

3. For each time, starting from t=T and working back to t=0, perform the following calculations in order:

CALL F_MODEL(F0_X(t), F_U(t), F_X(t+1))

$F\_X(t) = F0_X(t) + F_U(X(t))$

CALL F_ELF(F_gamma,F_uprime,F_u(t))

$F\_\text{gamma\_total} = F\_\text{gamma\_total} + F\_\text{gamma}$ $F\_\text{uprime\_total} = F\_\text{uprime\_total} + F\_\text{uprime}$ 4. Adapt gamma and uprime:

new gamma=old gamma−$LR1$*F_gamma_total new uprime=old uprime−$LR2$*F_uprime_total The assignment statements in this algorithm all represent the addition or subtraction of arrays, rather than scalars.

The algorithm above should be very straightforward to implement. If desired, one can actually start out by using possible values for X(T−1) as a starting point, instead of X(0); one can gradually work one's way back in time. Also, one must pay careful attention to the quality of the model (perhaps by testing for performance in simulations where the model generating the simulations is known). Convergence can be sped up by using adaptive learning rates; for example, as in HIC, one could use the update rule:

$$\text{new } LR1 = \text{old } LR2 * \left\{ a + b \frac{\text{new } F\_\gamma\_\text{total} \cdot \text{old } F\,\gamma\_\text{total}}{\text{old } F\_\gamma\_\text{total} \cdot \text{old } f\_\gamma\_\text{total}} \right\},$$

for some "arbitrary" a and b (such as 0.2 and 0.9).

EXAMPLE V

GENERAL METHOD FOR "ELASTICIZING" A FUZZY SYSTEM

In general, one could "elasticize" a fuzzy system by using the alternative "AND" operator described above. ("OR" operators follow trivially from AND, if one define "NOT" as one minus the original truth value.) That, in turn, permits one to use neural network learning methods to adapt any kind of AI system, including systems used for complex reasoning and planning.

For example, one can build fuzzy Action networks, which input a vector of sensor inputs X(t) (or an expanded state vector R(t)) and output a control vector, u(t). Most fuzzy controllers in the real world are fuzzy Action networks. One could also build fuzzy models of the system to be controlled, models which input R(t−1) and u(t−1) and output a prediction of R(t) and X(t). One could even build a fuzzy Critic network, which inputs R(t) (and maybe u(t)), and outputs an evaluation of how desirable the state R(t) is, as described in more detail in Paul Werbos, "Neurocontrol and Fuzzy Logic; Connections and Designs," *International Journal on Approximate Reasoning*, Vol. 6, No. 2, Feb. 1992, p.185.

There are many ways to exploit this approach in practical applications. For example, one can begin by asking a human expert how to control a system. Using fuzzy logic, one can translate his words into a fuzzy Action network. Then one can use "cloning" methods to adapt that Action network, to make it represent what the expert actually does. (Kosko, Bart Kosko, *Neural Networks and Fuzzy Systems*, Prentice-Hall, 1991, offers only one of the many methods which can be used to do this.) In a similar way, one can adapt a model of the system to be controlled. one can also ask the human to offer evaluation rules. Then one can use adaptive critic methods to adapt the Action network and the Critic network further, to yield a system which performs better than the human. If these are still fuzzy networks, one can use fuzzy logic to explain to the human what the computer is now doing; the human can change the utility function or performance measure, or suggest a new starting point, and start over.

To make this kind of hybrid approach possible, one needs two things: (1) one needs an easy way to translate a fuzzy system into a simple network Y=f(X,W), so that one can use the designs in HIC; (2) The fuzzy system must have sufficient degrees of freedom (weights W) so that adapting W will really provide enough flexibility for significant learning.

The simple kinds of fuzzy logic used in practical applications do not have these degrees of freedom. Also, they do not provide a true reasoning capability.

EXAMPLE VI

ELF USED IN PLACE OF THE USUAL 0–1 LOGIC USED IN CONVENTIONAL KNOWLEDGE-BASED OR EXPERT SYSTEMS

As an example, there has been widespread use in recent years of a system called the Real-Time Control (RCS) system, due to work by Albus and others. In at least some formulations, RCS consists of a ste of systems to make inquiries from experts, which are translated into the following sort of rules. The actual implemented controller consists of several blocks of "if-then" rules, each operating in parallel, each invoked independently on every time cycle. Each block is a set of simple if-then rules, as described above, except that the user is not restricted to input words and output words which describe external sensor input and actions. The user may also input from or output to a common shared memory. To use ELF to upgrade this system, one needs only translate the original IF-THEN rules in each block to the corresponding ELF equations, using the translation procedure above. This results in an adaptable ELF controller.

In order to adapt this whole system, one needs to construct a dual module for the entire system. To do this, one first constructs dual programs or modules for each of the IF-THEN blocks. The dual module for the whole system is simply a module which exercises each of these component dual modules in parallel. The resulting system is technically a time-lagged recurrent network (TLRN), which can then be adapted by any of the several methods for adapting TLRNs given in the Handbook of Intelligent Control, described relative to any network (including RCS networks) for which a primary and dual module are available.

EXAMPLE VII

A STOCHASTIC ENCODER/DECODER/PREDICTOR

FIG. 5 is a flow chart illustrating a Stochastic Encoder/Decoder/Predictor. Information from time t−1 is input using input means (10) to a Predictor Network (20). The Predictor Network (20) calculates $\hat{R}$ (t). Encoder Network (30) receives input x(t) (40) and outputs a vector, $\hat{R}$ (50). Random numbers are added to R to produce output $\hat{R}'$(60) as a function of $\partial$ (which may be estimated, for example, by the observed root mean square average of the difference between predicted and observed values). Signal $\hat{R}'$ and information from time (t−1) (70) are input to Decoder Network (80) in order to generate a predicted value, $\tilde{X}$(90). Each of the networks has associated weights.

As can be seen from the above description, it is possible to implement the invention in a computer using the subroutines described herein and others that could be adapted by those skilled in the art.

Thus, there has been described an Elastic Fuzzy Logic ("ELF") System is provided in which neural network learning techniques are combined with fuzzy logic techniques in order to accomplish artificial intelligence tasks such as pattern recognition, expert cloning and trajectory control, that has a number of novel features, and a manner of making and using the invention. The features involve the use of multiplier memory and multiplier means associated with each rule. The advantage of the invention is the resultant flexibility, power and intuitive interface between a human expert and a computer system.

While specific embodiments of the invention has been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure. Thus, the invention is not limited to the specific embodiment described herein, but is defined by the appended claims.

I claim:

1. A computer program product comprising:
   a computer storage medium and a computer program code mechanism embedded in the computer storage medium for causing a computer to implement a control circuit, the computer program code mechanism comprising:
   a first computer code device configured to implement a stochastic predictor, wherein the first computer code device receives a first plurality of inputs representing conditions at time t−1 and outputs a first prediction based on the first plurality of inputs;
   a second computer code device configured to implement a stochastic encoder, wherein the second computer code device receives the first plurality of inputs and a second plurality of inputs representing conditions at time t and outputs a second prediction based on the first and second plurality of inputs;
   a third computer code device configured to produce simulated values from the second prediction; and
   a fourth computer code device configured to implement a stochastic decoder, wherein the fourth computer code device receives the first plurality of inputs and the simulated values and outputs a prediction X as an output of the control circuit.

2. The computer program product as claimed in claim 1, wherein the third computer code device comprises a fifth computer code device configured to add random numbers to the second prediction to produce the simulated values.

3. The computer program product as claimed in claim 2, wherein the fourth computer code device comprises a fifth computer code device configured to produce the prediction with respect to time.

4. The computer program product as claimed in claim 2, further comprising a fifth computer code device configured to adapt the second computer code device based on the first and second predictions.

5. The computer program product as claimed in claim 2, further comprising a fifth computer code device configured to adapt the second and fourth computer code devices based on the first and second predictions.

6. The computer program product as claimed in claim 2, wherein the fifth code device further comprises a sixth computer code device configured to utilize gradients to adapt the second computer code device.

* * * * *